(12) United States Patent
Nagaoka

(10) Patent No.: US 9,757,834 B2
(45) Date of Patent: Sep. 12, 2017

(54) TRACK CONTROL APPARATUS

(71) Applicant: Kotaro Nagaoka, Tokyo (JP)

(72) Inventor: Kotaro Nagaoka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 524 days.

(21) Appl. No.: 14/374,576

(22) PCT Filed: Dec. 11, 2012

(86) PCT No.: PCT/JP2012/082097
§ 371 (c)(1),
(2) Date: Jul. 25, 2014

(87) PCT Pub. No.: WO2013/140679
PCT Pub. Date: Sep. 26, 2013

(65) Prior Publication Data
US 2014/0371899 A1 Dec. 18, 2014

(30) Foreign Application Priority Data
Mar. 21, 2012 (JP) .................. 2012-064058

(51) Int. Cl.
*B23Q 3/18* (2006.01)
*G05B 19/404* (2006.01)
*G05B 15/02* (2006.01)

(52) U.S. Cl.
CPC .......... *B23Q 3/18* (2013.01); *G05B 15/02* (2013.01); *G05B 19/404* (2013.01); *G05B 2219/41189* (2013.01); *G05B 2219/41194* (2013.01)

(58) Field of Classification Search
None
See application file for complete search history.

(56) References Cited

U.S. PATENT DOCUMENTS 6,437,534 B1    8/2002  Kakino et al.
2005/0027397 A1*  2/2005  Niemeyer .............. B25J 9/1689
                                                      700/245
(Continued)

FOREIGN PATENT DOCUMENTS

JP    63-206806    8/1988
JP    64-7203      1/1989
(Continued)

OTHER PUBLICATIONS

International Search Report issued Mar. 19, 2013, in PCT/JP2012/082097, filed Dec. 11, 2012.
(Continued)

*Primary Examiner* — Tuan Dao
(74) *Attorney, Agent, or Firm* — Oblon, McClelland, Maier & Neustadt, L.L.P.

(57) ABSTRACT

A track control apparatus includes an interpolation/acceleration and deceleration calculating unit that interpolates a commanded route and calculates a post-acceleration and deceleration interpolation route, an axis distributing unit that generates a position command for each movable axis from the post-acceleration and deceleration interpolation route, a servo-response calculating unit that calculates a servo response to the position command, a tangential-direction-servo-response calculating unit that obtains a tangential direction servo response from the post-acceleration and deceleration interpolation route, a reference-point generating unit that obtains a reference point from the tangential direction servo response, a position-vector correcting unit that corrects the position command for each movable axis to output a post-correction position command for each movable axis, and a servo control unit that outputs motor driving torque such that each movable axis follows the corresponding post-correction position command.

9 Claims, 5 Drawing Sheets

(56) References Cited

U.S. PATENT DOCUMENTS

| | | | |
|---|---|---|---|
| 2008/0027590 A1* | 1/2008 | Phillips | G05D 1/0088 701/2 |
| 2008/0218116 A1* | 9/2008 | Maeda | G05B 19/19 318/571 |
| 2013/0138236 A1 | 5/2013 | Nagaoka | |

FOREIGN PATENT DOCUMENTS

| | | |
|---|---|---|
| JP | 2-66604 | 3/1990 |
| JP | 2-185344 | 7/1990 |
| JP | 3-246605 | 11/1991 |
| JP | 6-282321 | 10/1994 |
| JP | 2001-79731 | 3/2001 |
| JP | 2006-15431 | 1/2006 |
| JP | 2011-145884 | 7/2011 |
| WO | 2012/026279 A1 | 3/2012 |

OTHER PUBLICATIONS

Naoki Uchiyama, et al., "On the Effectiveness of Contouring Control for Machine Tool Feed Drive Systems", Journal of the Japan Society for Precision Engineering, vol. 74, No. 11, 2008, pp. 1193-1198.

* cited by examiner

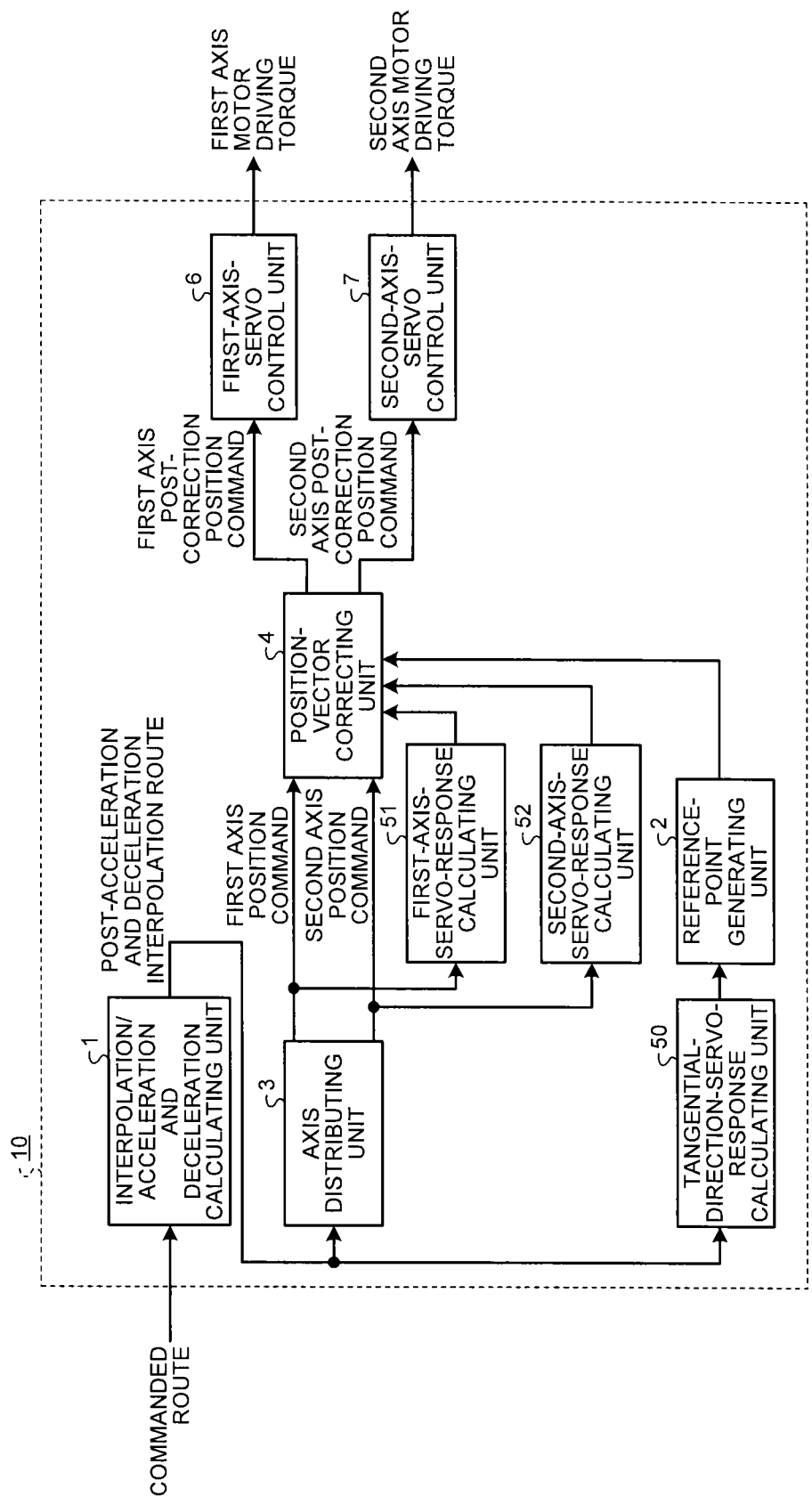

TRACK CONTROL APPARATUS

FIELD

The present invention relates to a track control apparatus for suppressing a track error and realizing high-speed and high-accuracy machining in control apparatuses such as a machine tool, a laser machine, and the like.

BACKGROUND

When machining is performed using a machine such as a machine tool or a laser machine, control is performed to cause the position of a tool with respect to a work piece to move along a designated route. This control is called track control. In general, the track control is performed by performing servo control to cause actual positions of movable axes of the machine to follow position commands for the movable axes calculated from the commanded route.

As a problem in performing the track control, an actual track deviates from the commanded route because of, for example, response delays of the movable axes to a control system. Usually, the control is performed for each of the movable axes of the machine. Therefore, because of an error due to, for example, the response delays of the movable axes to the control system, servo system responses of the movable axes lag behind position commands. When a moving direction of the commanded route does not change like a straight line, even if the axes move with delay, a track of the servo system response does not deviate from the commanded route. That is, although an error appears in a tangential direction of the commanded route, an error in a normal direction of the commanded route does not appear. On the other hand, when a moving direction of the commanded route changes like a curve, a corner shape, or the like, an error appears in the normal direction of the commanded route because of delays of the servo control systems of the axes. In the following explanation, in errors of servo system response positions with respect to a position command, components in the tangential direction of the commanded route are referred to as follow-up errors and components in the normal direction of the commanded route are referred to as track errors. In general, the track errors are undesirable because a machining shape does not coincide with an original shape when the track errors occur.

As means for suppressing the track errors, Patent Literature 1 discloses a method of calculating, on the basis of a machining shape recognized by looking ahead a program, optimum feed speed for suppressing an error to a fixed value or less, calculating an error amount that occurs when machining is performed at this speed, and adding a correction vector for canceling the error to an original commanded position to correct the commanded position. The direction of the correction vector is a direction perpendicular to a moving direction (a normal direction). The length of the correction vector is a value obtained by multiplying normal direction acceleration (a value obtained by dividing a square of speed by a curvature radius) with a predetermined coefficient.

Non Patent Literature 1 discloses a method of decomposing a response error of a servo system into a component in a tangential direction and a component in a normal direction of a commanded route and performing feedback control using a control input obtained by multiplying the components in the respective directions with individual gains to thereby independently control a follow-up error and a track error.

CITATION LIST

Patent Literature

Patent Literature 1: Japanese Patent Application Laid-Open No. H6-282321

Non Patent Literature

Non Patent Literature 1: Journal of the Japan Society for Precision Engineering Vol. 74. No. 11. 2008 pp. 1193 to 1198

SUMMARY

Technical Problem

However, there is a problem in that the methods according to the conventional technologies cannot be applied when acceleration in a route between commanded points changes because of the influence of acceleration and deceleration and when a complicated shape including a three-dimensional shape is commanded approximately using a very small line segment command. Near a start point and near an end point of a commanded route or near a place where commanded feed speed changes on the commanded route, allowable acceleration of a control target machine is exceeded when feed speed is suddenly changed. Therefore, acceleration and deceleration for gradually increasing or gradually reducing the feed speed is generally performed.

For example, in Patent Literature 1, the error amount is calculated on the basis of a commanded point commanded before acceleration and deceleration is performed. Further, the calculated error amount is an error amount in a state in which feed speed is fixed (a steady state). Therefore, in a state in which the feed speed changes as in acceleration and deceleration (a transient state), there is a problem in that the calculated error amount is different from an actual error amount, a response track obtained as a result of performing the correction is different from an original commanded track, and a distortion occurs in the shape of the response track.

In the method according to Non Patent Literature 1, the control input is set in a direction perpendicular to the commanded route or a direction same as the commanded route. Therefore, in a command for a corner shape and a command including a three-dimensional shape, a direction in which correction is performed and size of the correction suddenly change or become indefinite. When the correction is performed in such a situation, there is a problem in that an excessively large load on a driving system including a machine and vibration occur. Further, in Non Patent Literature 1, there is a problem in that it is likely that a control system becomes unstable because a servo system response error is fed back.

The present invention has been devised in view of the above, and it is an object of the present invention to obtain a track control apparatus capable of suppressing a track error to be sufficiently small and realizing high-speed and high-accuracy machining.

Solution to Problem

The present invention is directed to a track control apparatus that achieves the object. The track control apparatus controls a track of a movable part by simultaneously controlling motors for a plurality of movable axes. The track control apparatus includes an interpolation/acceleration and deceleration calculating unit that interpolates a given commanded route and executes an acceleration and deceleration calculation along the commanded route, thereby calculating a post-acceleration and deceleration interpolation route; an axis distributing unit that generates a position command for each movable axis from the post-acceleration and deceleration interpolation route; a servo-response calculating unit that calculates a servo response of each movable axis on the basis of the position command for each movable axis; a tangential-direction-servo-response calculating unit that calculates a tangential direction servo response of a tangential direction movement amount on the basis of the post-acceleration and deceleration interpolation route; a reference-point generating unit that calculates a correction reference point from the tangential direction servo response; a position-vector correcting unit that calculates, on the basis of the servo response of each movable axis and the correction reference point, a correction vector for suppressing a track error and corrects the position command for each movable axis with the correction vector, thereby outputting a post-correction position command for each movable axis; and a servo control unit that outputs motor driving torques to the motor for each movable axis respectively such that a position of each movable axis follow the post-correction position command for each movable axis.

Advantageous Effects of Invention

According to the present invention, there is an effect that it is possible to obtain a track control apparatus capable of correctly obtaining a correction vector even if a commanded shape is a three-dimensional shape or formed of very small line segments and suppressing a track error to be sufficiently small and realizing high-speed and high-accuracy machining.

BRIEF DESCRIPTION OF DRAWINGS

FIG. 1 is a block diagram of the configuration of a track control apparatus according to a first embodiment of the present invention.

FIG. 3-1 is a diagram for explaining details of an acceleration calculation according to the first embodiment of the present invention.

FIG. 3-2 is a diagram of an acceleration and deceleration pattern of tangential direction velocity q'(t) according to the first embodiment of the present invention.

FIG. 3-3 is a diagram of a post-acceleration and deceleration interpolation route formed from post-acceleration/deceleration interpolation points according to the first embodiment of the present invention.

DESCRIPTION OF EMBODIMENTS

Embodiments of a track control apparatus according to the present invention are explained in detail below with reference to the drawings. Note that the present invention is not limited by the embodiments.

First Embodiment

Figures 1, 3:
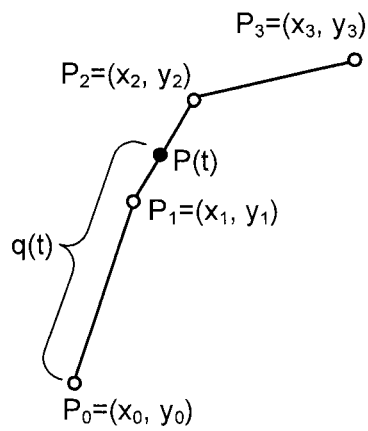
Figures 2, 3:
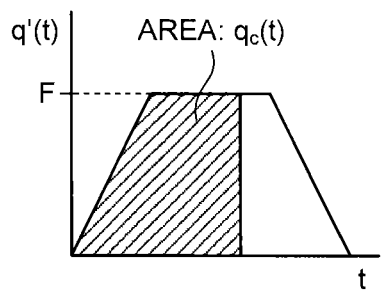
Figure 3:
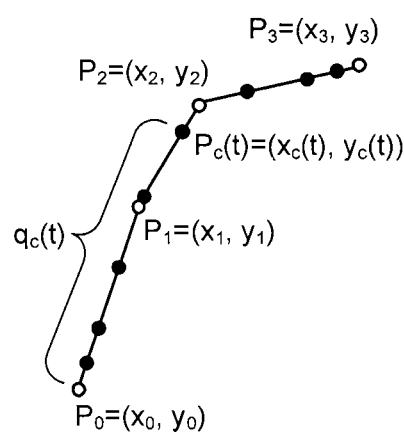

FIG. 1 is a block diagram of the configuration of a track control apparatus 10 according to a first embodiment of the present invention. A commanded route is given to an interpolation/acceleration and deceleration calculating unit 1 as a coordinate value on a track of a movable part track of a machine in a form of an NC program or the like. An interpolation method (a straight line, an arc, a spline, etc.) between commanded coordinate values and moving speed, that is, feed speed in a direction along the track are simultaneously given to the interpolation/acceleration and deceleration calculating unit 1 by the NC program or the like. The interpolation/acceleration and deceleration calculating unit 1 calculates a post-acceleration and deceleration interpolation route by interpolating the commanded coordinate values with the designated method and performing a calculation for accelerating and decelerating the machine at separately-designated predetermined acceleration or acceleration time constant along a commanded route.

Further, an axis distributing unit 3 given with the post-acceleration and deceleration interpolation route calculates position commands for movable axes of the machine such that a movable part of the machine passes the post-acceleration and deceleration interpolation route. In this embodiment, there are two movable axes. The axis distributing unit 3 calculates a first axis position command and a second axis position command as position commands to a first axis and a second axis. For example, an X axis of the machine is set as a first movable axis (the first axis) and a Y axis of the machine is set as a second movable axis (the second axis). A first-axis-servo-response calculating unit 51 and a second-axis-servo-response calculating unit 52 calculate a first axis servo response and a second axis servo response respectively from the first axis position command and the second axis position command and output the first axis servo response and the second axis servo response.

A tangential-direction-servo-response calculating unit 50 calculates a tangential direction servo response from a tangential direction movement amount of the post-acceleration and deceleration interpolation route and outputs the tangential direction serve response. A reference-point generating unit 2 calculates a position of a reference point from the tangential direction servo response and outputs the position of the reference point. A position-vector correcting unit 4 calculates a correction vector from the first axis servo response, the second axis servo response, and the position of the reference point and adds components in movable axis directions of the correction vector to the first axis position command and the second axis position command, which are position commands for the movable axes, to thereby calculate a first axis post-correction position command and a second axis post-correction position command as post-correction position commands for the movable axes. A first-axis-servo control unit 6 and a second-axis-servo control unit 7 respectively output first axis motor driving torque and second axis motor driving torque, which are motor driving torques of the first axis and the second axis, such that the position of the first axis and the position of the second axis respectively follow the first axis post-correction position command and the second axis post-correction position command.

Figure 2:
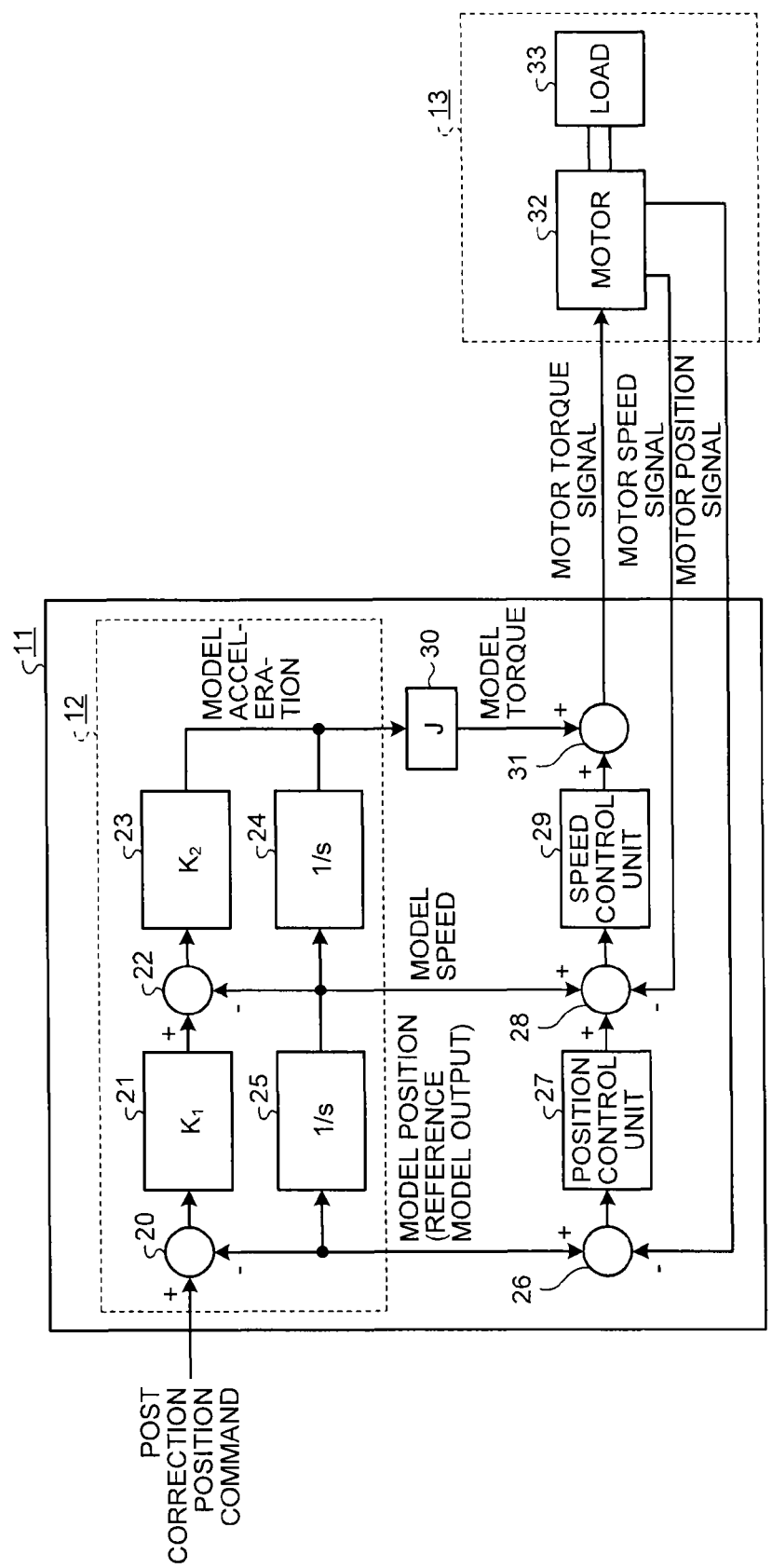
FIG. 2 is a block diagram of the configuration of a servo control unit according to the first embodiment of the present invention.

The first-axis-servo control unit 6 and the second-axis-servo control unit 7 have the same configuration. A block diagram of the configuration of the first-axis-servo control unit 6 and the second-axis-servo control unit 7 is shown in FIG. 2 as a servo control unit 11. A subtracter 20 subtracts a model position from a post-correction position command input to the servo control unit 11. A model gain multiplier 21 multiplies the post-correction position command with a first model gain $K_1$. A subtracter 22 subtracts model speed from the post-correction position command. A model gain multiplier 23 multiplies the post-correction position command with a second model gain $K_2$ and outputs model acceleration. An integrator 24 integrates the model acceleration and outputs the model speed. An integrator 25 integrates the model speed and outputs the model position. A block to which the post-correction position command is input and from which the model position, the model speed, and the model acceleration are output is referred to as reference model unit 12.

An adder-subtracter 26 subtracts a motor position signal output by a motor 32 from the model position output by the integrator 25 and outputs a position error. A position control unit 27 applies control such as proportional control to the position error. An adder-subtracter 28 adds the model speed to an output of the position control unit 27, subtracts the motor speed signal output by the motor 32 from the output, and outputs a speed error. A speed control unit 29 applies control such as proportional and integral control to the speed error. A multiplier 30 multiplies the model acceleration with a value equivalent to control target inertia and calculates model torque. An adder 31 adds the model torque to an output of the speed control unit 29 and outputs a motor torque signal. The motor torque signal is input to the motor 32. A machine system 13 formed by the motor 32 and a load 33 is driven by the motor torque signal. A motor speed signal and a motor position signal are output to the servo control unit 11.

The servo control unit 11 is a two-degree-of-freedom controller that uses a reference model. The servo control unit 11 can independently design followability to a command and responsiveness to disturbance. Followability of a motor position to a position command depends on the first model gain $K_1$ and the second model gain $K_2$. Responsiveness of the motor position to disturbance depends on the design of the position control unit 27 and the speed control unit 29. Therefore, a response of the motor position is controlled to follow a model position, which is an output of the reference model, irrespective of a characteristic of an actual control target.

To prevent a response track from being distorted during track control, position responses of the movable axes needs to be set (substantially) the same. The position responses are response characteristics of an input of the servo control unit 11 to a motor position signal. If the response characteristics are different among the movable axes, when a linear shape is designated, a response track deviates from a commanded straight line or a response track to an arc command is distorted in an oblique direction. In this embodiment, gains of the reference model are set to the same value in the first-axis-servo control unit 6 and the second-axis-servo control unit 7. That is, a first model gain of the reference model of the first-axis-servo control unit 6 and a first model gain of the reference model of the second-axis-servo control unit 7 are set to the same value. A second model gain of the reference model of the first-axis-servo control unit 6 and a second model gain of the reference model of the second-axis-servo control unit 7 are set to the same value. The response of the motor position is determined by a characteristic of the reference model. Therefore, the same position response is obtained if completely the same reference model is used.

Details of calculations by the units are explained. The interpolation/acceleration and deceleration calculating unit 1 interpolates commanded coordinate values with a designated method and further performs an acceleration and deceleration calculation to calculate a commanded position for each interpolation cycle on a commanded route. As a method of the interpolation, there are linear interpolation, arc interpolation, spline interpolation, and the like. The interpolation cycle is a fixed cycle decided as a specification of the track control apparatus 10. In general, a short cycle equal to or shorter than several milliseconds is used. More highly accurate track control can be performed when the interpolation cycle is shorter. However, a processing load of a processor or the like used for the calculation is larger. A point at each interpolation cycle obtained as a result of the interpolation/acceleration and deceleration is referred to as post-acceleration/deceleration interpolation point. A route formed by post-acceleration/deceleration interpolation points is referred to as interpolation route. The acceleration and deceleration calculation is a calculation for preventing commanded acceleration from exceeding allowable acceleration of the movable axes of the machine to be excessively large and is a calculation for recalculating interpolation points on the interpolation route such that a change in speed is equal to or lower than acceleration separately designated by parameters or the like. That is, in movement from a start point to an end point, an interval among the interpolation points is reduced such that the speed gradually increases immediately after the start point. The interval among the interpolation points is reduced such that the speed gradually decreases immediately after the end point.

Details of this acceleration and deceleration calculation are explained with reference to an example shown in FIG. 3-1 to FIG. 3-3. As shown in FIG. 3-1, movement at speed F from a start point $P_0=(x_0, y_0)$ to an end point $P_3=(x_3, y_3)$ through halfway points $P_1=(x_1, y_1)$ and $P_2=(x_2, y_2)$ is examined. The start point, the passing points, and the end point are referred to as commanded points. The commanded points are indicated by white circles in FIG. 3-1. Coordinate values of the commanded points are commanded by an NC program or the like. A distance along a commanded route from the start point $P_0$ to a point $P(t)$ on the route at any time t is represented as $q(t)$. A movement length from the start point to the end point is represented as L. L is a sum of lengths of line segments that connect $P_0$, $P_1$, $P_2$, and $P_3$. When line segment length from $P_{n-1}$ to $P_n$ is defined as $l_n$ (n=1, 2, and 3), $L=l_1+l_2+l_3$.

With time differential of q(t) set as a tangential direction speed q'(t), an acceleration pattern of q'(t) is set as shown in FIG. 3-2. This is a trapezoidal pattern, the height of which indicates the commanded feed speed F and the area of which indicates the movement length L from the start point to the end point. Gradients of an acceleration section and a deceleration section are set to be acceleration separately designated by parameters or the like. Acceleration and deceleration are linearly performed. However, the acceleration and the deceleration are sometimes performed in an S shape to smooth the movement of the machine. A movement length $q_c(t)$ after acceleration and deceleration is calculated by time-integrating the tangential direction speed q'(t). With Δt set as an interpolation cycle, a post-acceleration/deceleration movement length $q_c(N×Δt)$ at t=N×Δt (N is a positive integer) is calculated. A point ahead of the start position $P_0$ by the length $q_c(N \times \Delta t)$ along the commanded route is an Nth post-acceleration/deceleration interpolation point.

A post-acceleration and deceleration interpolation route formed by post-acceleration/deceleration interpolation points is as shown in FIG. 3-3. Information concerning the post-acceleration and deceleration interpolation route includes the tangential direction movement length $q_c(t)$ after acceleration and deceleration, types of interpolation (linear interpolation, arc interpolation, spline interpolation, etc.), and parameters (a start point position, an end point position, and other shape parameters) necessary for the interpolation. As the other shape parameters, there are parameters such as a center position and a radius in the case of the arc interpolation and a coefficient of a spline function in the case of the spline interpolation.

The axis distributing unit 3 calculates coordinate values of the axes at the post-acceleration/deceleration interpolation points on the post-acceleration and deceleration interpolation route. In the case of an example shown in FIG. 3, for example, a vector $p_c(x_c, y_c)$ representing a coordinate of a post-acceleration/deceleration interpolation point $P_c$ present on a line segment $P_1P_2$ is calculated by subjecting a vector $p_1=(x_1, y_1)$ representing a start point $P_1$ of a line segment to which Pc belongs and a vector $p_2=(x_2, y_2)$ representing an end point $P_2$ to the linear interpolation using a ratio determined by the movement length $q_c(t)$. Therefore, a position command vector $p_c(t)=(x_c(t), y_c(t))$ representing a coordinate value of the position command $P_c(t)$ at time t is represented by the following Formula (1):

[Math. 1]

$$p_c(t) = \frac{q_c(t) - l_1}{|p_2 - p_1|}(p_2 - p_1) + p_1 \quad (1)$$

From the above, a first axis position command is represented as $x_c(t)$ and a second axis position command is represented as $y_c(t)$.

The first-axis-servo-response calculating unit 51 and the second-axis-servo-response calculating unit 52 respectively calculate servo responses (a first axis servo response and a second axis servo response) to the first axis position command and the second axis position command. The calculation of the servo responses is performed as explained below. As explained above, a response of the servo system can be represented by a response of the reference model. Therefore, servo system response positions of the first axis and the second axis are respectively calculated by calculating model positions, which are outputs of the reference model, when the first axis and second axis position commands are given as inputs. A vector having the servo system response positions of the first axis and the second axis as components in movable axis directions is represented as servo response position vector. A track drawn by the position vector is represented as servo response track.

The model position, which is the output of the reference model, can be calculated by representing the reference model unit 12 shown in FIG. 2 in a form of a differential equation, a difference equation, a transfer function, or the like and calculating a solution of the differential equation, the difference equation, the transfer function, or the like with a numerical value calculation. When a commanded shape is known, an analysis solution can be calculated by an integral calculation.

For example, a transfer function Gm(s) of the reference model shown in FIG. 2 is represented by the following Formula (2):

[Math. 2]

$$G_m(s) = \frac{K_1 K_2}{s^2 + K_2 s + K_1 K_2} \quad (2)$$

An output at the time when a certain input is given to the reference model is calculated by subjecting a product of the transfer function of the reference model and Laplace transform of the given input to inverse Laplace transform. A vector $p_s(t)=(x_s(t), y_s(t))$ of a servo response position $P_s(t)$ to the position command vector $p_c(t)$ is represented by the following Formula (3):

[Math. 3]

$$p_s(t) = \begin{bmatrix} x_s(t) \\ y_s(t) \end{bmatrix} = \begin{bmatrix} L^{-1}[G_m(s) \; L[x_c(t)]] \\ L^{-1}[G_m(s) \; L[y_c(t)]] \end{bmatrix} \quad (3)$$

where, L[f(t)] represents the Laplace transform of f(t) and $L^{-1}[F(s)]$ represents the inverse Laplace transform of F(s). A servo response of the first axis is represented as $x_s(t)$ and a servo response of the second axis is represented as $y_s(t)$.

Like the first-axis-servo-response calculating unit 51 and the second-axis-servo-response calculating unit 52, the tangential-direction-servo-response calculating unit 50 calculates a tangential direction servo response $q_s(t)$, which is a servo response to the tangential direction movement length $q_c(t)$ after acceleration and deceleration. However, although a vector is used as an input when a servo response of a position is calculated, in the case of the tangential direction movement length, an input is a scalar value. The tangential direction servo response $q_s(t)$ can be calculated by subjecting a product of the transfer function of the reference model and the Laplace transform of the given input $q_c(t)$ to the inverse Laplace transform. The tangential direction servo response $q_s(t)$ is represented by the following Formula (4):

[Math. 4]

$$q_s(t)=L^{-1}[G_m(s)L[q_c(t)]] \quad (4)$$

The reference-point generating unit 2 calculates a point $P_r(t)$ ahead of the start point by the length of the tangential direction servo response along the post-acceleration and deceleration interpolation route and sets the point $P_r(t)$ as a reference point (a correction reference point). A coordinate $p_r(t)$ of the reference point is calculated as explained below. First, the reference-point generating unit 2 determines, from the tangential direction servo response $q_s(t)$ and the line segment length $l_n$ between the commanded points, to which line segment the reference point belongs. That is, the reference-point generating unit 2 determines that the reference point is present on $P_0P_1$ if $q_s(t)$ is smaller than $l_1$ and determines that the reference point is present on $P_1P_2$ if $q_s(t)$ is equal to or larger than $l_1$ and smaller than $l_1+l_2$. It is assumed that $q_s(t)$ is present on $P_1P_2$. Subsequently, the reference-point generating unit 2 determines a coordinate of the reference point by subjecting a start point and an end point of the line segment, to which the reference point belongs, to the linear interpolation using a ratio determined by a length $q_r(t)$ of the tangential direction servo response.

The coordinate $p_r(t)=(x_r(t), y_r(t))$ of the reference point is calculated by the following Formula (5):

[Math. 5]

$$p_r(t) = \frac{q_r(t) - l_1}{|p_2 - p_1|}(p_2 - p_1) + p_1 \quad (5)$$

The position-vector correcting unit 4 sets a vector from the servo response position $P_s(t)$ to the reference point $P_r(t)$ as a correction vector and sets a vector obtained by adding the correction vector to a position vector of the interpolation point $P_c(t)$ after acceleration and deceleration as a position vector after correction. That is, the position-vector correcting unit 4 calculates a first axis post-correction position command and a second axis post-correction position command respectively by adding a first axis component and a second axis component of the correction vector to the first axis position command $x_c(t)$ and the second axis position command $y_c(t)$.

Figure 4:
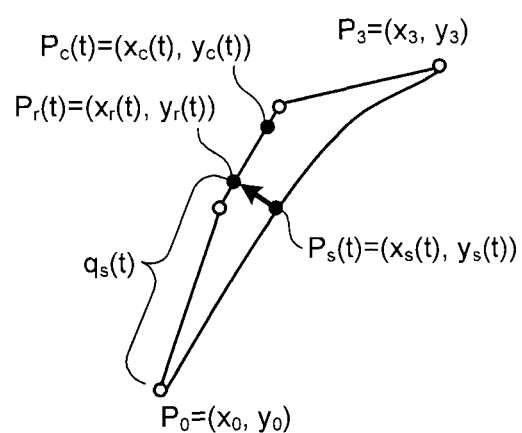
FIG. 4 is a diagram for explaining the operation of a position-vector correcting unit according to the embodiment of the present invention.

A relation of the correction vector in the position-vector correcting unit is shown in FIG. 4. The correction vector is a vector from the servo response position $P_s(t)$ to the reference point $P_r(t)$ calculated taking into account the tangential direction servo response. In the correction vector, deviation of the servo response from the commanded route is reversed. The correction vector is in a direction generally perpendicular to the commanded track. Therefore, by adding the correction vector to the position commands (the first axis position command $x_c(t)$ and the second axis position command $y_c(t)$), it is possible to correct the deviation of the servo response from the commanded route.

When the reference point calculated taking into account the tangential direction servo response is not used, for example, if a vector from the servo response $P_s(t)$ to the interpolation point $P_c(t)$ of the position command is used as the correction vector, the correction vector includes error components not only in a direction perpendicular to the commanded route but also in a direction parallel to the commanded route. A method of drawing a perpendicular from the servo response $P_s(t)$ to the commanded route is also conceivable. However, then, when the servo response passes the inner side of an acute corner, there are a plurality of candidates of a direction in which the perpendicular is drawn. The correction vector is not uniquely decided.

As explained above, according to the first embodiment, the reference point of correction is calculated by using the servo response in the tangential direction. The correction vector is calculated on the basis of the interpolation route information obtained after the interpolation and the acceleration and deceleration processing are performed. Therefore, even if a commanded shape is a three-dimensional shape or formed by very small line segments, it is possible to correctly obtain the correction vector. Consequently, it is possible to obtain a track control apparatus capable of suppressing a track error to be sufficiently small and realizing high-speed and high-accuracy machining.

By performing the calculation of the servo response using a filter having a response characteristic (substantially) the same as a position response of an actual movable axis, it is possible to accurately estimate the servo response.

By performing the calculation of the position response and the servo response of the movable axis using a filter having a response characteristic (substantially) the same as a position response of an actual movable axis, it is possible to accurately estimate a position of the reference point.

Further, by setting the (correction) reference point taking into account the commanded route and the servo response of the tangential direction length, it is possible to accurately determine a direction and a length of the correction vector.

By adding the vector from the servo response position to the reference point as the correction vector, it is possible to accurately correct a track error from the reference point to the servo response position.

Second Embodiment

Figure 5:
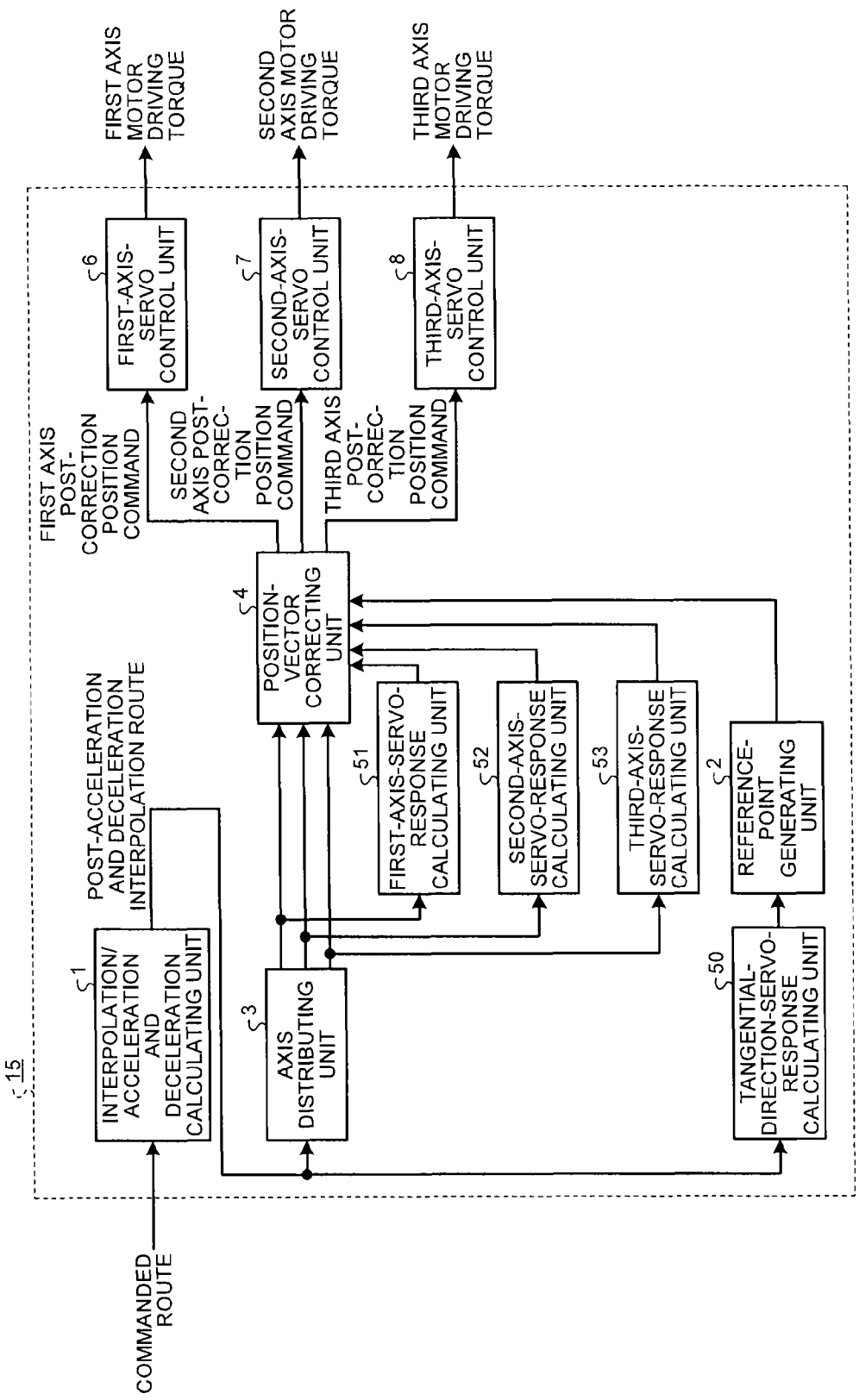
FIG. 5 is a block diagram of the configuration of a track control apparatus according to a second embodiment of the present invention.

FIG. 5 is a block diagram of the configuration of a track control apparatus 15 according to a second embodiment of the present invention. The second embodiment is different from the first embodiment in that there are three movable axes of a machine and servo control units (the first-axis-servo control unit 6, the second-axis-servo control unit 7, and a third-axis-servo control unit 8) and servo-response calculating units (the first-axis-servo-response calculating unit 51, the second-axis-servo-response calculating unit 52, and a third-axis-servo-response calculating unit 53) are provided for the respective movable axes.

In this embodiment, a command including a three-dimensional shape is performed in a machine including three movable axes of an X axis, a Y axis, and a Z axis. The X axis is set as a first axis, the Y axis is set as a second axis, and the Z axis is set as a third axis. Reference model gains of the respective servo control units (the first-axis-servo control unit 6, the second-axis-servo control unit 7, and the third-axis-servo control unit 8) are set the same in the first axis, the second axis, and the third axis.

Differences from the first embodiment are explained below.

The axis distributing unit 3 calculates coordinate values of the axes at post-acceleration/deceleration interpolation points on a post-acceleration and deceleration interpolation route. In this embodiment, in FIG. 3-1 to FIG. 3-3, a coordinate of the Z axis is added concerning the points. That is, in FIG. 3-1, a machine moves at speed F from a start point $P_0=(x_0, y_0, z_0)$ to an end point $P_3=(x_3, y_3, z_3)$ through halfway points $P_1=(x_1, y_1, z_1)$ and $P_2=(x_2, y_2, z_2)$. A vector $P_c=(x_c, y_c, z_c)$ representing a coordinate of a post-acceleration/deceleration interpolation point $P_c$ present on a line segment $P_1P_2$ is calculated by subjecting a vector $p_1=(x_1, y_1, z_1)$ representing a start point $P_1$ and a vector $p_2=(x_2, y_2, z_2)$ representing an end point $P_2$ of a line segment, to which $P_c$ belongs, to linear interpolation using a ratio determined by $q_c(t)$. Therefore, a position command vector $p_c(t)=(x_c(t), y_c(t), z_c(t))$ representing a coordinate value of a position command $P_c(t)$ at time t is represented by the following Formula (6):

[Math. 6]

$$p_c(t) = \frac{q_c(t) - l_1}{|p_2 - p_1|}(p_2 - p_1) + p_1 \quad (6)$$

From the above, a first axis position command is represented as $x_c(t)$, a second axis position command is represented as $y_c(t)$, and a third axis position command is represented as $z_c(t)$.

The third-axis-servo-response calculating unit 53 performs a calculation same as the calculation by the first-axisresponse calculating unit 51 and the second-axis-servo-response calculating unit 52 to calculate a servo response to the third axis position command.

A vector $p_s(t)=(x_s(t), y_s(t), z_s(t))$ of a servo response position $P_s(t)$ to the position command vector $p_c(t)$ is represented by the following Formula (7):

[Math. 7]

$$p_s(t) = \begin{bmatrix} x_s(t) \\ y_s(t) \\ z_s(t) \end{bmatrix} = \begin{bmatrix} L^{-1}[G_m(s) \; L[x_c(t)]] \\ L^{-1}[G_m(s) \; L[y_c(t)]] \\ L^{-1}[G_m(s) \; L[z_c(t)]] \end{bmatrix} \quad (7)$$

A servo response of the first axis is represented as $x_s(t)$, a servo response of the second axis is represented as $y_s(t)$, and a servo response of the third axis is represented as $z_s(t)$.

A coordinate $p_r(t)=(x_r(t), y_r(t), z_r(t))$ of a reference point in the reference-point generating unit is calculated by the following Formula (8):

[Math. 8]

$$p_r(t) = \frac{q_r(t) - l_1}{|p_2 - p_1|}(p_2 - p_1) + p_1 \quad (8)$$

In the second embodiment, elements of a vector are changed from two elements to three elements. Otherwise, calculations are performed completely the same as in the first embodiment. Consequently, it is possible to correct an error of the servo response from a commanded route.

Therefore, according to the second embodiment, even if the command includes the three-dimensional shape, the reference point of correction is calculated using the servo response in the tangential direction and the correction vector is calculated on the basis of the interpolation route information obtained after the interpolation and the acceleration and deceleration processing are performed. Therefore, it is possible to correctly calculate the correction vector.

Further, the present invention is not limited to the embodiments explained above. In an implementation stage, the present invention can be variously modified without departing from the spirit of the present invention. The embodiment includes inventions in various stages. Various inventions can be extracted according to appropriate combinations of a disclosed plurality of constituent elements. For example, even if several constituent elements are deleted from all the constituent elements described in the embodiments, when the problems explained in the section of the technical problem can be solved and the effects explained in the section of the advantageous effects of the invention can be obtained, a configuration in which the constituent elements are deleted can be extracted as an invention. Further, the constituent elements explained in different embodiments can be combined as appropriate.

INDUSTRIAL APPLICABILITY

As explained above, the track control apparatus according to the present invention is useful as control apparatuses for a machine tool, a laser machine, and the like and is, in particular, suitable for a control apparatus required to perform high-speed and high-accuracy machining with a track error suppressed.

REFERENCE SIGNS LIST

1 Interpolation/acceleration and deceleration calculating unit
2 Reference-point generating unit
3 Axis distributing unit
4 Position-vector correcting unit
6 First-axis-servo control unit
7 Second-axis-servo control unit
8 Third-axis-servo control unit
10, 15 Track control apparatuses
11 Servo control unit
12 Reference model unit
13 Machine system
20 Subtracter
21 Model gain multiplier
22 Subtracter
23 Model gain multiplier
24, 25 Integrators
26, 28 Adder-subtracters
27 Position control unit
29 Speed control unit
30 Multiplier
31 Adder
32 Motor
33 Load
50 Tangential-direction-servo-response calculating unit
51 First-axis-servo-response calculating unit
52 Second-axis-servo-response calculating unit
53 Third-axis-servo-response calculating unit

The invention claimed is:

1. A track control apparatus that controls a track of a movable part by simultaneously controlling motors for a plurality of movable axes, the track control apparatus comprising:
a hardware processor configured to function as an interpolation/acceleration and deceleration calculator configured to interpolate a given commanded route and executes an acceleration and deceleration calculation along the commanded route, thereby calculating a post-acceleration and deceleration interpolation route;
an axis distributor configured to generate a position command for each movable axis from the post-acceleration and deceleration interpolation route;
a servo-response calculator configured to calculate, for each movable axis, a servo response of each movable axis on the basis of the position command for each movable axis;
a tangential-direction-servo-response calculator configured to calculate a tangential direction servo response of a tangential direction movement amount on the basis of the post-acceleration and deceleration interpolation route;
a reference-point generator configured to calculate a correction reference point from the tangential direction servo response;
a position-vector corrector configured to calculate, on the basis of the servo response of each movable axis and the correction reference point, a correction vector for suppressing a track error and corrects the position command for each movable axis with the correction vector, thereby outputting a post-correction position command for each movable axis; and
a servo controller configured to output motor driving torques to the motor for each movable axis respectively such that a position of each movable axis follow the post-correction position command for each movable axis.

2. The track control apparatus according to claim 1, wherein the servo-response calculator for each movable axis is independent for each movable axis, and is a filter whose response between an input and an output is the same as a position response of the corresponding movable axis respectively.

3. The track control apparatus according to claim 1, wherein the tangential-direction-servo-response calculator is a filter whose response between an input and an output is the same as a position response of each movable axis, and receives, as an input, a scalar value of a length along the commanded route from a start point of the commanded route to a post-acceleration/deceleration commanded position.

4. The track control apparatus according to claim 2, wherein the servo controller is independent for each movable axis, and the position response of the movable axis is a response characteristic of an input of the servo controller of the movable axis to a position signal of the motor for the movable axis.

5. The track control apparatus according to claim 2, wherein all the position responses for the movable axes are the same.

6. The track control apparatus according to claim 1, wherein the reference-point generator is configured to calculate, as the correction reference point, a point ahead of a start point of the commanded route by a length obtained by the tangential direction servo response along the post-acceleration and deceleration interpolation route.

7. The track control apparatus according to claim 1, wherein the position-vector corrector is configured to set, as the correction vector, a vector from a point determined by the servo response for each movable axis to the correction reference point and obtains, as the post-correction position command, a result obtained by adding the correction vector to a point determined by the position command.

8. The track control apparatus according to claim 3, wherein the servo controller is independent for each movable axis, and the position response of the movable axis is a response characteristic of an input of the servo controller of the movable axis to a position signal of the motor for the movable axis.

9. The track control apparatus according to claim 3, wherein all the position responses for the movable axes are the same.

* * * * *